United States Patent [19]

Meyer

[11] Patent Number: 5,211,266
[45] Date of Patent: May 18, 1993

[54] RAIL SKATE

[75] Inventor: J. Joe Meyer, Williamsburg, Ind.

[73] Assignee: Western-Cullen-Hayes, Inc., Richmond, Ind.

[21] Appl. No.: 810,307

[22] Filed: Dec. 19, 1991

[51] Int. Cl.$^5$ .............................................. B61K 7/02
[52] U.S. Cl. ........................................ 188/62; 188/35; 188/63; 104/259; 104/260
[58] Field of Search ................... 188/33, 35, 36, 62, 188/63; 104/257-260

[56] References Cited

U.S. PATENT DOCUMENTS

| | | | |
|---|---|---|---|
| 842,679 | 1/1907 | Martin | 188/36 |
| 1,598,741 | 9/1926 | Nelson | 188/63 |
| 3,027,851 | 4/1962 | Hayes | 188/36 |
| 4,216,724 | 8/1980 | Grillet | 188/36 |

FOREIGN PATENT DOCUMENTS 2618799 11/1977 Fed. Rep. of Germany ........ 188/36

Primary Examiner—Robert J. Oberleitner
Assistant Examiner—Chris Schwartz
Attorney, Agent, or Firm—Allegretti & Witcoff, Ltd.

[57] ABSTRACT

An improved rail skate intended for mounting on the top of a rail, including an upwardly inclined ramp portion and an entry or toe portion whereby a wheel of an approaching railcar will roll up on top of the entry or toe portion and engage the ramp thereby stopping movement of the wheel relative to the rail skate and thereafter causing the rail skate to slide along the top of the rail until the railcar is ultimately stopped, the rail skate having a shoe element with a substantially V-shaped cross-section including a raised central portion and depending sides.

7 Claims, 3 Drawing Sheets

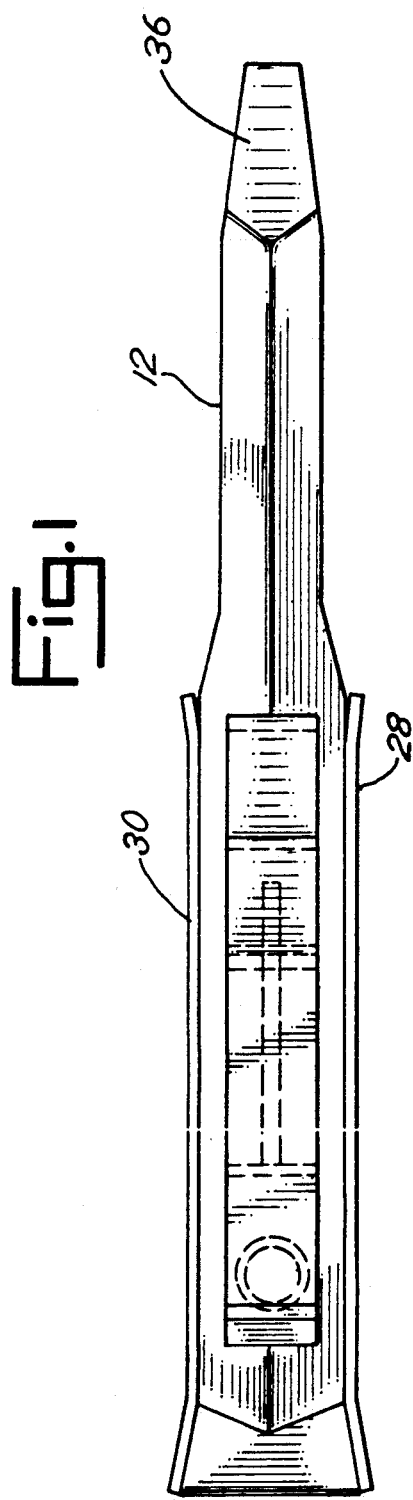
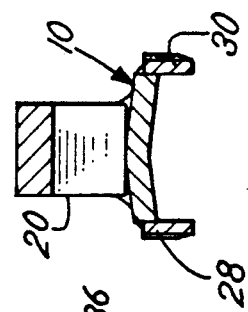
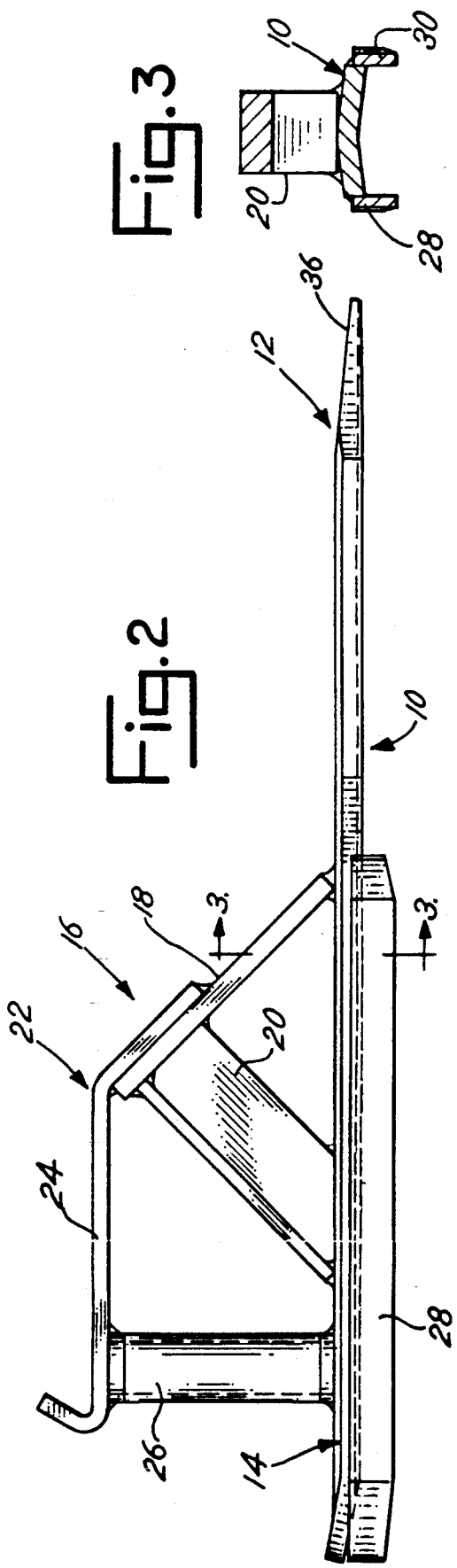

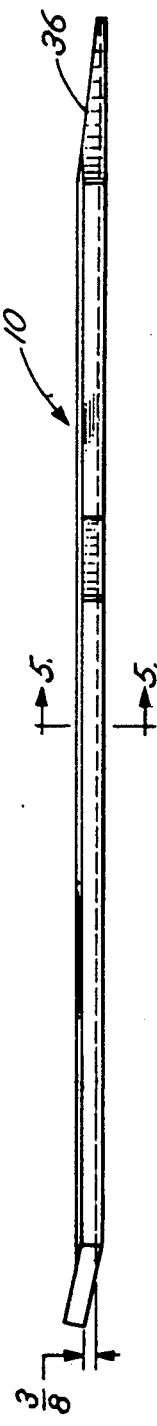
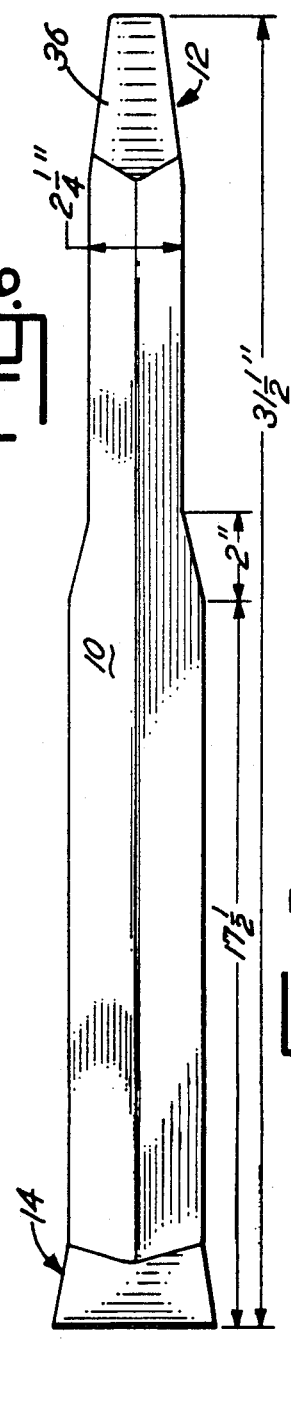
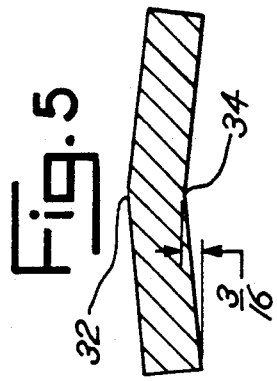
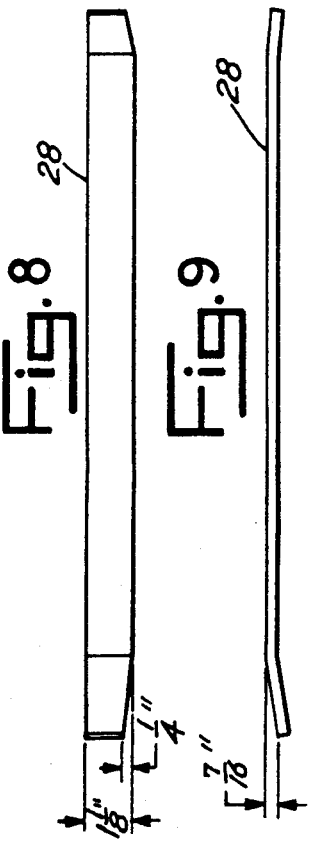

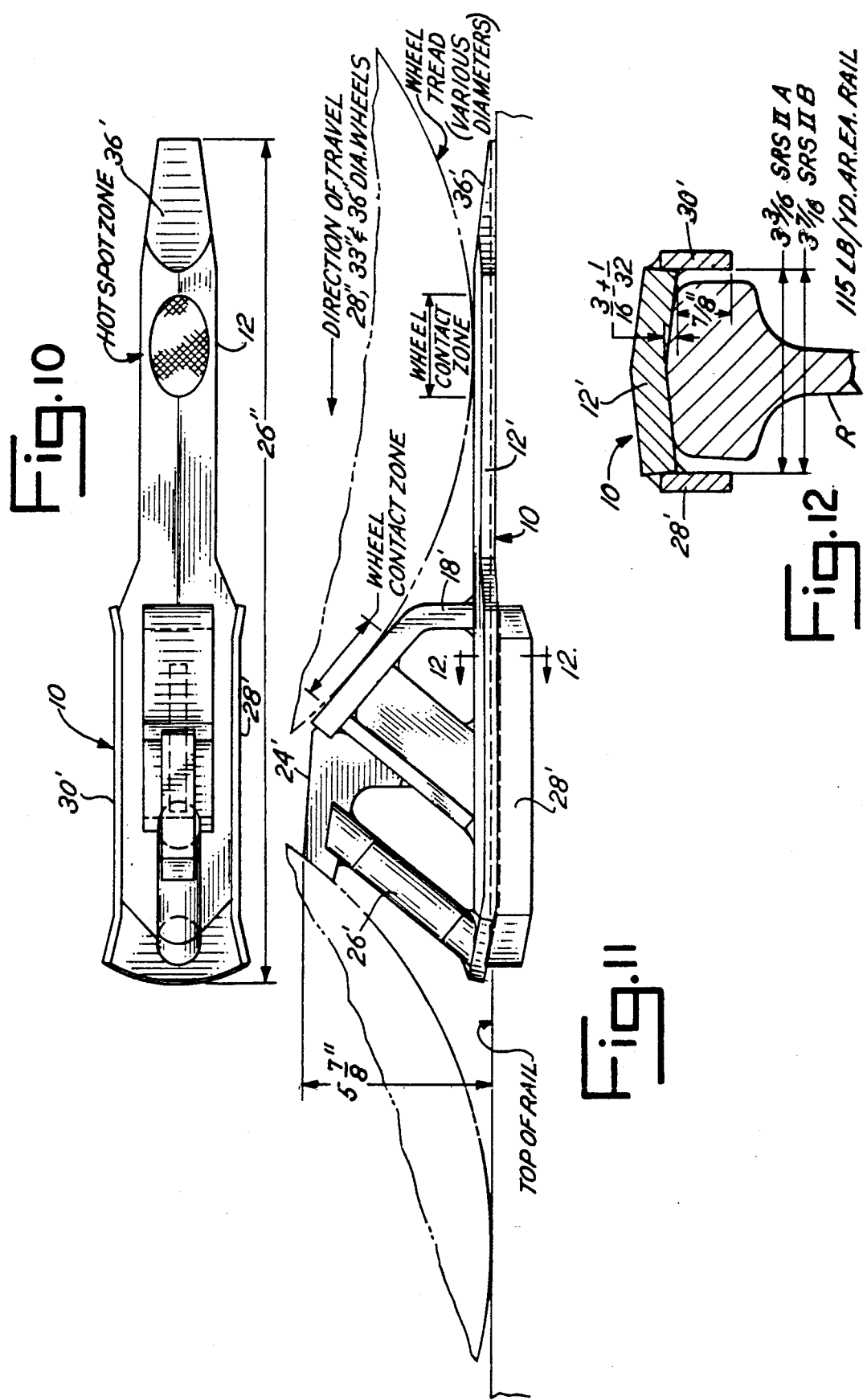

RAIL SKATE

BACKGROUND OF THE INVENTION

Field of the Invention

The present invention relates to a rail skate of the type which is positioned on a rail to engaged by the wheel of a railcar thereby causing the railcar wheel to cease rotation and causing the rail skate to slide along the rail with the railcar wheel supported thereon thereby retarding movement of the railcar and ultimately stopping the same. Such a rail skate is commonly placed on a single rail, but a rail skate may be placed on both rails in side-by-side relation for additional stopping power if desired.

Rail skates have been known for many years. Such rail skates commonly include a toe or entry portion designed so that a rail wheel will ride up on the toe and roll along the toe a short predetermined distance until it engages an upwardly inclined ramp which prevents further movement of the railcar wheel relative to the rail skate. Thereafter, the forward movement of the railcar will cause the rail skate to slide along the top of the rail. Due to substantial friction between the rail skate and the top of the rail, the forward motion of the railcar will be retarded, and ultimately the railcar will be stopped.

A major problem with known rail skates has been the bending or curling up of the toe portion of the rail skate due to heating of the underside thereof caused by the friction between the rail skate and the rail as the rail skate slides along the rail under the substantial weight of the rail car applied to the wheel. The resultant heating of the underside of the toe portion of the rail skate causes that underside to expand, and as a result the toe portion of the rail skate has a tendency to curl up. If significant upward curling of the toe portion occurs, the rail skate can be rendered useless because a rail wheel will not thereafter be able to properly ride up onto the top of the toe portion.

Known rail skates generally have toe portions with a flat underside which is positioned on the top of the rail. The top of the rail itself may also be flat, although most new rails have a slight radius. In any event, such known rail skates commonly suffer from the above-mentioned disadvantage of upward bending or curling in the toe portion due to heat caused by friction as the rail skate slides along the rail. Heretofore, known rail skates have been made substantially heavier in an attempt to reduce the above curling effect.

Certain known rail skates which are made by casting may have a slight radius on the underside of the toe portion due to conventional draft angles used in the casting process. However, such a slight radius which occurs as a result of known casting techniques does not significantly reduce the tendency of the toe section to curl up as described above.

The main object of the present invention is to provide a rail skate which substantially eliminates the tendency of the toe portion of the skate to curl up due to heat caused by friction.

Another object is to achieve the above-mentioned objective without the need to provide an unusually heavy rail skate.

A further more specific object is to provide a rail skate having a toe portion formed with a linear or longitudinal break to achieve a substantially V-shaped cross-section so as to distribute the heat to the two sides of the underside of the toe portions and, at the same time, increase the resistance of the toe portion to upward curling or bending.

The foregoing and other objects and advantages of the invention will be apparent from the following description of a preferred embodiment thereof, taken in conjunction with the accompanying drawings.

DESCRIPTION OF THE DRAWINGS

FIG. 1 is a top plan view of a rail skate constructed in accordance with the present invention;

FIG. 2 is a side elevation of the rail skate of FIG. 1;

FIG. 3 is a vertical cross-section taken along the line 3—3 of FIG. 2;

FIG. 4 is a side elevational view of the shoe component of the rail skate of the present invention, the entry portion being shown at the left hand end;

FIG. 5 is a vertical cross-section taken along the line 5—5 of FIG. 4;

FIG. 6 is a top plan view of the shoe component of FIG. 4;

FIG. 7 is a top plan view of the left guide member which forms a component of the rail skate of the present invention;

FIG. 8 is a top plan view of a blank member from which the left guide member of FIG. 7 may be formed by a bending operation;

FIG. 9 is a top plan view of a right guide member which may be formed from a blank of the type shown in FIG. 8;

FIG. 10 is a top plan view similar to FIG. 1 and showing a slightly modified form of a rail skate constructed in accordance with the present invention;

FIG. 11 is a side elevational view of the rail skate of FIG. 10; and

FIG. 12 is a vertical cross-section taken along the line 12—12 of FIG. 11.

Now, in order to acquaint those skilled in the art with the manner of making and using the invention, I shall describe, in conjunction with the accompanying drawings, a preferred embodiment of the invention.

DETAILED DESCRIPTION OF THE INVENTION

FIGS. 1-3 illustrate a rail skate constructed in accordance with the present invention. There is shown a shoe member 10 having a toe end 12 and a rear end 14. In the embodiment illustrated, the toe end 12 of the shoe 10 has a length of 14.5 inches, at which point an upwardly inclined ramp element 16 is provided, including a first upwardly inclined ramp element 18, a supporting element 20 which supports the ramp element 18, a second ramp element 22 which includes a horizontal portion 24, and a second generally vertical supporting element 26. The foregoing ramp elements are welded together as shown in FIG. 2, and the ramp assembly is welded to the top of the shoe member 10 rearwardly of the toe end 12 as best shown in FIG. 2.

In accordance with the present invention, the rail skate is preferably produced substantially entirely from fabricated steel, and the shoe member 10 is preferably formed of high strength, low alloy steel having a high yield strength.

A pair of longitudinal guide members are welded to the opposite sides of the shoe 10 to extend approximately from the beginning of the inclined ramp 18 to the rear end of the shoe portion 14. Such guide members are shown at 28 and 30. FIG. 8 shows a blank of the type from which each of the guides 28 and 30 may be formed by a simple bending operation to bend the two ends of each guide as shown in FIGS. 7 and 9. The purpose of the two guides is that they extend downwardly on opposite sides of a rail when a rail skate assembly is positioned on top of a rail, and the two guides 28 and 30 maintain the rail skate on the rail as the rail skate slides along the top of a rail during a railcar-stopping operation. The two guides 28 and 30 are spaced somewhat from the opposite sides of the rail so as not to interfere with the sliding of the rail skate along the rail.

FIG. 6 is an enlarged top plan view of the shoe element 10 which in the embodiment shown as a total length of 31.5 inches, and where the toe portion 12 has a width of 2.25 inches. As best shown in FIG. 5, which is an enlarged cross-section of the shoe 10, there is a linear break shown at 32 on the top of the shoe and at 34 on the underside thereof whereby the cross-section of the shoe is substantially V-shaped with the two side portions depending downwardly from the central axis.

The foregoing cross-sectional configuration extends the full length of the shoe element, including, in particular, throughout the length of the toe section 12 which is the portion that is normally subject to upward curling due to heat generated during the sliding of the shoe 10 on a rail.

In operation, as a rail car approaches the toe end of the rail skate, assuming only one rail skate is mounted on one of a pair of rails, the approaching railcar wheel will roll up the inclined entry portion of the toe as shown at 36 in FIG. 2. As the railcar wheel rolls up the inclined toe portion 36, the wheel will be raised approximately one-half inch relative to the track. Because the standard rail wheel flange has a radial dimension of one inch, the raising of the rail wheel will not disengage the rail wheel flange from the rail, so the railcar will continue to be maintained in position on the rail.

Referring to FIG. 2, the rail wheel will roll along the toe portion 12 of the shoe 10 for a distance of approximately 14.5 inches, until the rail wheel engages the upwardly inclined ramp 18, at which time the rail wheel will be prevented from further rotation, and continued forward movement of the railcar will cause the entire rail skate assembly to be carried along the top of the rail with the railcar. The friction of the rail skate as it slides along the top of the rail, under the weight of the rail wheel, will substantially retard the movement of the railcar until it is ultimately stopped.

During the foregoing operation, as the rail skate slides along the top of a rail, substantial friction is created between the underside of the shoe member 10 and the top of the rail. One advantage of the V-shaped cross-section of the shoe member, as shown in FIGS. 3 and 5, is that the hot spot created between the shoe element 10 and the top of the rail is created at the two sides or at two points, rather than at one point. More important, the V-shaped shoe will afford excellent resistance to bending of the toe portion of the shoe 12 and will resist upward curling of the shoe element thereby providing a heavy duty skate without a heavy weight. The foregoing is in contrast with prior art rail skates which have been made extra heavy in an attempt to resist the curling effect.

Reference is now made to FIGS. 10-12 which show a slightly modified embodiment of the rail skate of FIGS. 1-3. In the embodiment of FIG. 11, the inclined ramp member 18' is curved rather than straight as in the embodiment of FIG. 2 and also the remaining structural members shown at 24' and 26' are modified slightly from the FIG. 2 embodiment, although the operation is essentially the same.

FIG. 11 illustrates the position of various rail wheels which are schematically shown in dotted lines to indicate the position of a rail wheel after it has rolled up over a toe portion 36' and onto the top of the shoe 12 to the point where the wheel contacts the inclined ramp portion 18'. As previously explained, after the wheel contacts the inclined ramp, relative motion of the wheel relative to the rail skate stops, and thereafter the rail skate is caused to move along the top of the rail along with the wheel until the railcar is ultimately stopped.

FIGS. 11 and 12 further illustrate the manner in which the rail skate sits on top of a rail R. In addition, FIG. 10 schematically illustrates a hot spot zone in the area where the railcar wheel sits on top of the toe end 12 of the shoe 10.

It should be understood that the cross-sectional shape of the shoe 10 is most important along the toe portion 12 because it is that portion over which the rail wheel will roll after it rolls up the entrance portion 36. While the cross-sectional shape shown in FIG. 5 is a section taken rearwardly of the toe portion 12, the same cross-sectional shape is provided throughout the length of the shoe 10. Similarly, FIG. 3 is a section taken rearwardly of the toe portion 12 of FIG. 2, but again that same cross-sectional shape is utilized throughout the length of the shoe 10.

Referring again to the cross-sectional illustrations in FIGS. 3 and 5, the included angle defined by the V-shaped underside of the shoe is approximately 167 degrees, and preferably within the range of 164 to 170 degrees. However, the advantages of the invention may be achieved by utilizing an included angle in the range of 160 degrees to 174 degrees.

What is claimed is:

1. A friction stopping device which is mounted on top of a rail and includes an entry or toe portion onto which a wheel of an approaching railcar will roll, and also a stopping member against which the wheel engages to stop relative motion between the wheel and the stopping device thereby causing the stopping device to slide along a top of the rail with the wheel positioned on top thereof until the railcar is stopped, the improvement comprising, a shoe member including said entry portion, said stopping member being attached to a top of said shoe member at a rear end of said entry portion, said shoe member having a longitudinal linear break, said break forming a line along a center of said shoe member thereof to form a substantially V-shaped cross-section comprising a central high point and depending side portions.

2. A friction stopping device as defined in claim 1 where said rail skate is produced substantially entirely from fabricated steel.

3. A friction stopping device as defined in claim 1 where said shoe member is formed of high strength, low alloy steel having a high yield strength.

4. A friction stopping device as defined in claim 1 where said linear break extends along substantially the entire length of said shoe member.

5. A friction stopping device as defined in claim 1 where the included angle defined by an underside of the V-shaped cross-section is in an approximate range of 160 degrees to 174 degrees.

6. A friction stopping device as defined in claim 5 where said included angle is in an approximate range of 163 degrees to 171 degrees.

7. A friction stopping device as defined in claim 5 where said included angle is approximately 167 degrees.

* * * * *